United States Patent [19]

Mochel et al.

[11] Patent Number: 5,054,377
[45] Date of Patent: Oct. 8, 1991

[54] VEHICLE VENTILATION

[75] Inventors: Paul J. Mochel, Studio City; Leonard Stobar, Oceanside, both of Calif.

[73] Assignee: Elixir Industries, Gardena, Calif.

[21] Appl. No.: 593,095

[22] Filed: Oct. 5, 1990

[51] Int. Cl.$^5$ .............................................. B60J 7/00
[52] U.S. Cl. ..................................... 98/2.14; 296/217; 296/223
[58] Field of Search ................. 98/2.14; 296/216, 217, 296/223

[56]      References Cited
U.S. PATENT DOCUMENTS

| 722,539 | 3/1903 | Rushton . | |
| 2,173,890 | 9/1939 | Tuttle | 296/216 |
| 2,328,659 | 9/1943 | McKenna | 98/42.16 |
| 2,810,334 | 10/1957 | Perks et al. | 98/9 |
| 4,113,302 | 9/1978 | Bos | 98/2.14 X |
| 4,201,122 | 5/1980 | Maciag | 98/2.14 |
| 4,201,123 | 5/1980 | Maciag et al | 98/2.14 |
| 4,643,478 | 2/1987 | Boots | 296/223 X |
| 4,662,671 | 5/1987 | Davis | 296/217 |
| 4,690,040 | 9/1987 | Barnett | 98/2.14 |
| 4,754,695 | 7/1988 | Kovacic | 98/2.14 |

FOREIGN PATENT DOCUMENTS

| 210124 | 9/1987 | Japan | 296/216 |
| 1397251 | 6/1975 | United Kingdom | 98/2.14 |

Primary Examiner—Harold Joyce
Attorney, Agent, or Firm—Poms, Smith, Lande & Rose

[57]     ABSTRACT

A recreational vehicle vent (14,16) is formed of a streamlined body (12) having a forward fixed riser (14) and a movable cover (16) which, when closed, forms a smooth continuous aerodynamic surface together with the fixed riser. The cover is movably mounted to the vent frame by means of a pair of transversely extending crossed links (140,142) at the front and a second independent pair of transversely extending crossed links (200,202) at the back. The two link pairs are independently operated by geared actuators (180,206) so that either the front of the cover or the back of the cover can be independently lifted or both can be lifted together.

32 Claims, 4 Drawing Sheets

VEHICLE VENTILATION

BACKGROUND OF THE INVENTION

The present invention relates to ventilation of vehicles and more particularly concerns a recreational vehicle vent that provides a plurality of ventilation positions having improved stabilization of the vent cover.

Recreational vehicles such as campers, trailers, motor vans, motor coaches and the like are commonly furnished with ventilation devices to provide for interior ventilation both during vehicle motion and when the vehicle is at rest. For ventilation during vehicle motion there is commonly provided a vent body in the form of a scoop fixed to the exterior of the vehicle, at the side or on the roof. Frequently the vent body is fixed to a frame of a vehicle opening by a continuous hinge so that the rear portion of the body may be opened and held in a reasonably stable position by the continuous hinge at its forward portion. In some arrangements a form of scoop fixed to the exterior of the vehicle is employed with a forwardly facing opening through which air is forced into the vehicle during motion. Although this arrangement is effective for forcing air into the vehicle, it is of relatively little use when the vehicle is stopped and will not afford effective ventilation except when the prevailing wind happens to be directed into the scoop opening. Furthermore it is difficult to seal such vents against water that may be forcibly driven through the opening during vehicle motion.

In U.S. Pat. No. 4,038,911 there is described an arrangement in which a vent cover that is pivoted to the vent frame at its front solely by a continuous hinge may have its rear lifted for a venturi type action. In addition, the vent cover has a front opening that is closed by a uniquely sealed door so as to provide the vent cover with a second opening at the forward portion. The arrangement requires a two part movable vent which includes a movable door that must be properly sealed during motion.

In all such vehicle vents it is not only important that proper ventilation be provided, but it is essential that the opening be adequately sealed when ventilation is not desired. Adequate sealing is a frequent problem in such devices.

Devices that employ a scoop to gather air flowing into a forwardly facing opening generally provide greatly increased wind resistance during vehicle motion as they are not shaped for minimizing aerodynamic drop.

Because direction of air flow relative to the vehicle will vary considerably during different conditions of operation of the vehicle or different wind conditions for the stationary vehicle, it is desirable that a vent be capable of taking advantage of wind flowing in any direction to provide good ventilation. The requirement for taking advantage of air flow from varying directions conflicts with the requirement for stabilizing the open cover during vehicle motion. If a stabilizing continuous hinge is used, the open positions of the vent cover are limited. Therefore, hinging arrangements of the prior art, particularly those with multi-directional openings, have not provided adequate stability.

Accordingly, it is an object of the present invention to provide multi-directional ventilation that avoids or minimizes above mentioned problems.

SUMMARY OF THE INVENTION

In carrying out principles of the present invention in accordance with a preferred embodiment thereof, a vent cover is provided with an open forward portion that defines a cover front opening. A fixed riser is connected to the vent frame adjacent the cover front opening and has a rear portion displaced from the vent frame. Flexible means are provided for mounting the vent cover for motion of its open forward portion between a lower position in which the cover front opening is adjacent to and closed by the rear portion of the fixed riser and an upper position in which the cover front opening is open and displaced from the riser rear portion so as to effectively scoop air into the vehicle during forward motion. According to a feature of the invention the cover is mounted to the vent frame at forward and rear portions by independent pairs of transversely extending crossed flexible links that are pivotally and slidably connected to transverse stabilizing beams secured to the frame and to the cover. The crossed flexible link mounting allows either the forward or rear portion of the cover to be independently raised from the frame to tilt the cover forwardly or rearwardly, and also allows both forward and rear portions to be raised to provide a complete omni-directional opening.

DETAILED DESCRIPTION OF THE INVENTION

Figure 1:
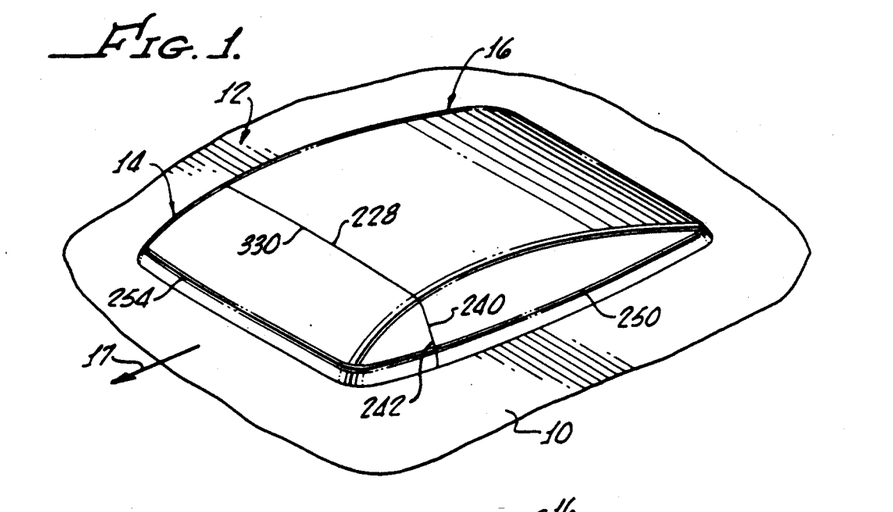
FIG. 1 is a pictorial elevation of a vehicle roof showing a vent embodying principles of the invention in closed position.
Figure 2:
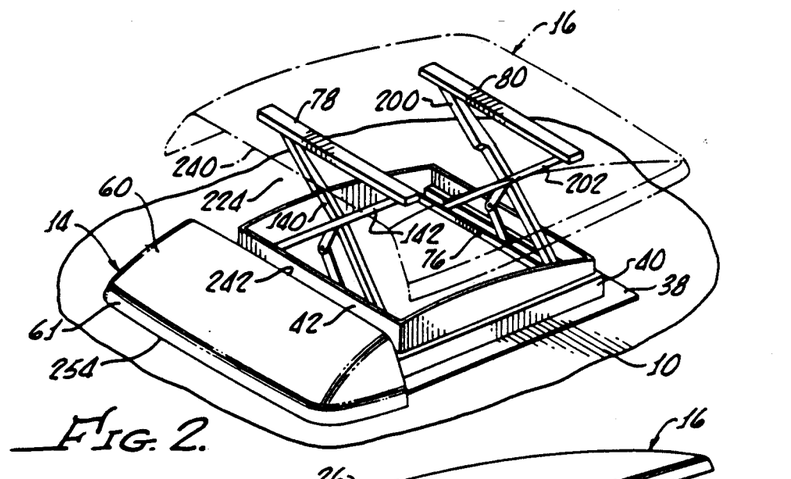
FIG. 2 is a simplified pictorial illustration showing the vent of FIG. 1 in one of its raised positions.

As can be seen in FIG. 1, a wall of a vehicle, which may be a side wall or a roof, has mounted thereto a streamlined body 12 incorporating a fixed riser 14 at its forward portion, fixedly attached to the front portion of a fixed frame, and a movable rear cover section 16 that is movably attached to the fixed frame. The body is mounted to a vehicle adapted to travel in the direction of arrow 17 so that the fixed riser is at the front of the streamlined body. The riser and cover are shown in FIG. 1 in cover closed position and, in such position, provide a completely streamlined body with low drag aerodynamic characteristics. The cover 16 is movably mounted by means of fore and aft pairs of transversely extending links 18,20 to a perimetral frame 22 that is fixedly attached to an opening 24 in the vehicle roof 10, as can be seen in FIG. 2.

Figure 3:
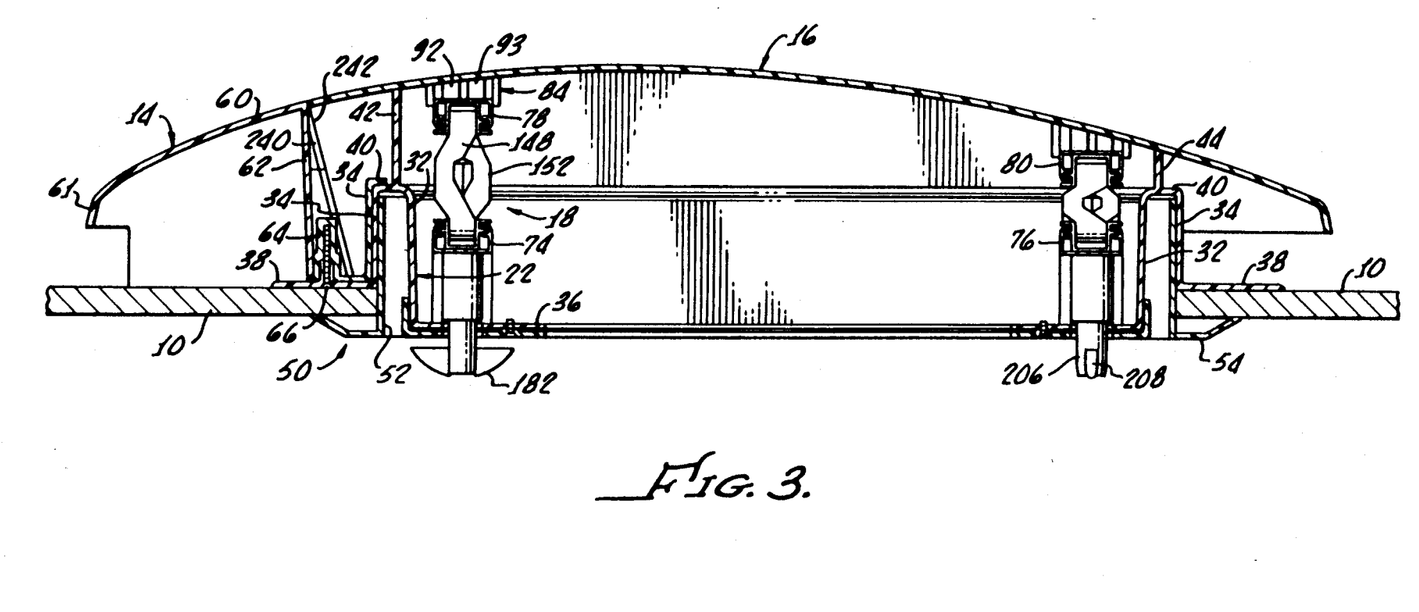
FIG. 3 is a longitudinal sectional view of the vent in closed position.
Figure 4:
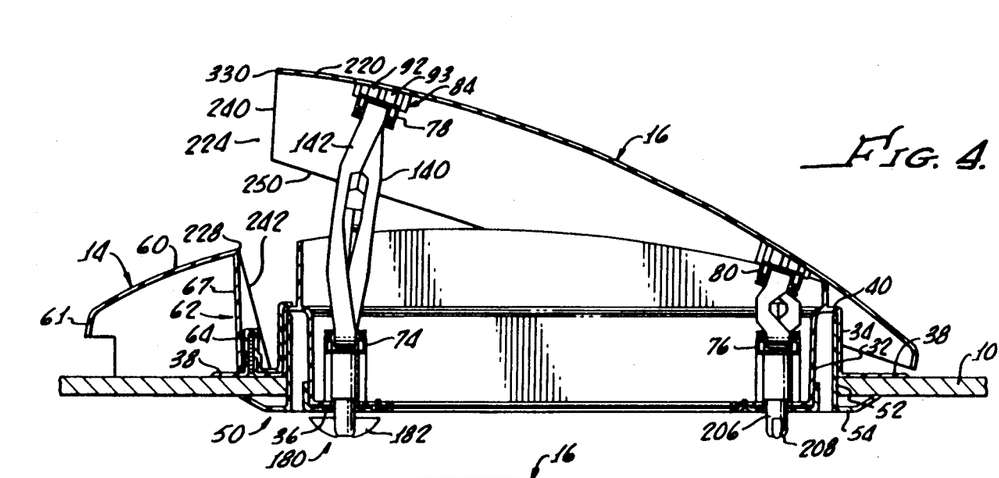
FIG. 4 is a longitudinal sectional view showing the vent with its front raised.
Figure 5:
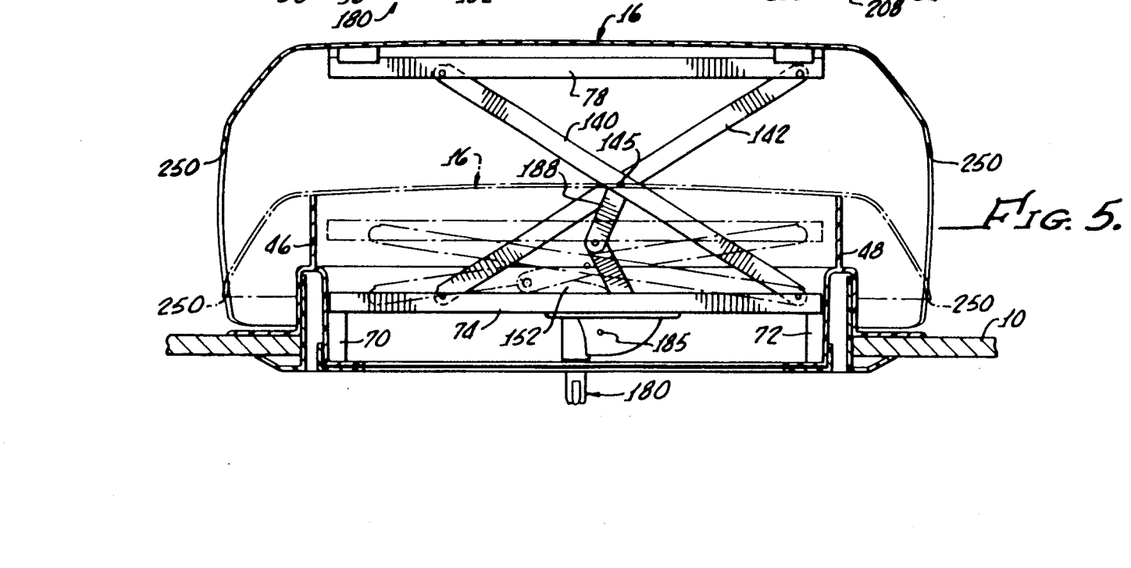
FIG. 5 is a transverse sectional view showing the front linkage.

As can be best seen in FIGS. 3, 4 and 5, the vehicle opening, preferably, but not necessarily, of a rectangular shape, is framed by the vent frame 22 which has a continuous perimetral double walled rim formed of walls 32,34 to which are integrally attached inner frame flanges 36, also extending perimetrally about the opening, and outer or connecting perimetral flanges 38 that contact the outer side of roof 10. The frame rim walls 32,34 are interconnected at an upper portion thereof by a rim top section 40 to which is affixed a perimetrally continuous vertically upwardly extending cover support flange having a front section 42, a shorter rear section 44, and side sections 46,48. The rectangular opening in vehicle roof 10 and the vent frame 22 itself are trimmed by a continuous perimetral garnish strip 50 having a continuous upstanding wall 52 extending into the frame rim 32,34 and an outwardly extending angulated trim flange 54 that contacts the underside of the vehicle roof 50. The frame and garnish strip are secured to the vehicle by conventional fasteners (not shown).

Fixed riser 14 is formed with an aerodynamically curved, transversely extending body section 60 to the rear of which is fixedly secured an integral, depending, somewhat triangular support section 62 having downwardly opening screw receiving lugs 64 that receive screws 66 extending upwardly through the outer flange 38 of the frame 22. Thus a plurality of transversely spaced screws 66 fixedly secure the riser 60, at its rear portion, to the frame 22, which itself is fixed to the vehicle roof by means of bolts or screws (not shown) extending through the outer flange 38 and through garnish 50 into the roof 10. The rear part 62 of riser 14 inclines upwardly and forwardly to accommodate motion of the cover, as will be explained below. The riser body section 60 extends in a smooth aerodynamic curve upwardly and rearwardly from its front edge 61, which is located forward of the front of frame 22. Thus the riser forms an aerodynamic surface that enables a smooth air flow over the closed vent cover or efficiently directs air into the front opening of the raised vent cover when the vehicle is in motion.

The two pairs of links 18,20 are identical except for location and are connected to the vent frame 22 and to the movable cover section 16 by transverse stabilizing beams 74, 76, 78,80 and link connecting brackets or hinge blocks, as more particularly illustrated in FIGS. 5, 6, 7, and 8. To each corner of the frame is fixed an upstanding beam support lug, such as front beam support lugs 70 and 72 of FIG. 5, integrally formed with the frame. Horizontally and transversely extending Ushaped lower beams 74 and 76 have their respective ends resting upon and fixedly secured to the four beam supports of the frame. Suitable screws (not shown) are arranged to extend through the web of the beams into the supporting lugs 70,72 on the frame to fix the beams to the frame.

Figures 6, 7, 8:
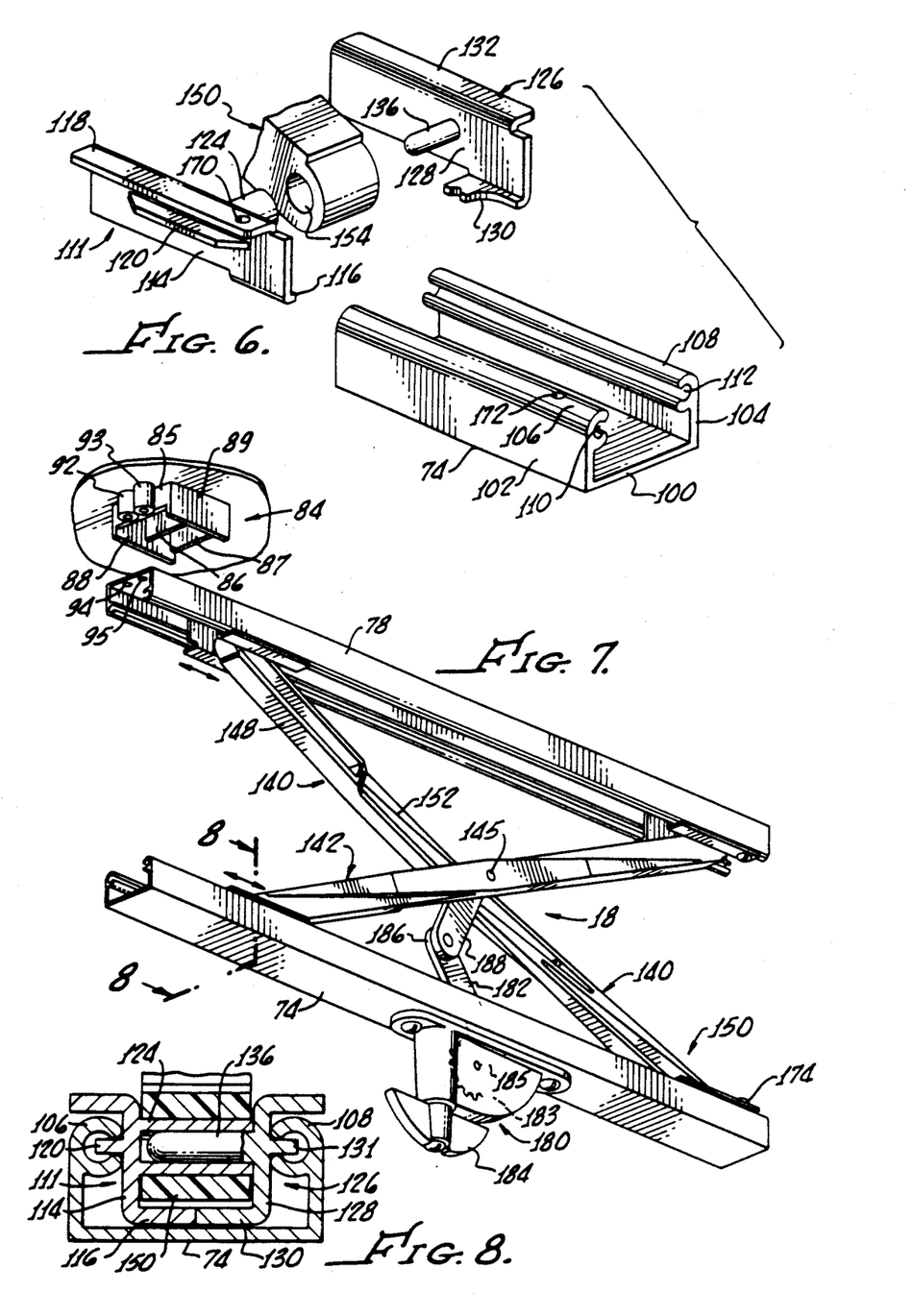
FIG. 6 is an exploded pictorial view showing a link connecting bracket or hinge block and a fragment of a mounting beam.
FIG. 7 is a pictorial view of one pair of crossed links and actuator.
FIG. 8 is a section showing the mounting of the link connecting bracket in a cross beam.

An identical pair of transversely extending upper beams 78,80 have their ends respectively fixed to four beam mounting cover brackets, such as bracket 84 of FIG. 7, which are integrally formed at corners of an imaginary rectangle laid out at the inside surface of movable vent cover 16. As can be seen in FIG. 7, each beam mounting bracket includes three mutually spaced longitudinally (relative to the vent) extending ribs 85,86,87 having ends interconnected by end plates 88,89, all integrally molded to the under surface of the cover 16. Adjacent an outer plate 85 of the bracket are a pair of apertured and threaded lugs 92,93 which receive screws (not shown) extending through apertures 94,95 formed in the end of the web of upper beam 78. Thus, forward lower transverse beam 74 and rear lower transverse beam 76 are both fixed at their ends to the beam supports 70 and 72 (and similar beam supports at the rear of the frame), while the upper forward and upper rear beams 78,80 are fixed to and transversely extend across the inside of the movable cover 16.

Each beam is of U-shape, as previously mentioned, having a web 100 and first and second upstanding side walls or legs 102,104 (see FIG. 6). At the free ends of the side walls 102,104 are inwardly projecting c-shaped ribs or strips 106,108 which extend longitudinally for the full length of each beam and have oppositely facing inwardly directed guide openings 110,112 respectively. The ribs 106,108 perform both a reinforcing and guiding function.

The two pairs of crossed links are identical and the end of each is connected to one of the beams by a link connecting bracket or hinge block illustrated in detail in FIGS. 6 and 8. The link connecting brackets are all identical to one another with the sole exception being that four of the brackets (all four on the right side, for example) are fixedly connected to the beams, whereas the other four (all four on the left side) are mounted and guided to slide longitudinally along the beams. Each link connecting bracket comprises a sleeve section 111 having a vertical wall 114 connected to a lower inwardly projecting flange 116 at one end and an upper outwardly projecting flange 118 at the other end. Integral with an intermediate portion of wall 114 is a relatively short outwardly projecting and longitudinally extending guide tongue 120 that is slidably received in the opening 110 of the bracket sleeve section 111. Fixed to and projecting inwardly from an intermediate portion of upstanding sleeve section wall 114 is a short circular cylindrical hollow sleeve 124. A pin section 126 of each link connecting bracket includes a vertical upstanding wall 128 having an inwardly extending flange 130 at a lower end thereof and an outwardly extending flange 132 at an upper end thereof. Outwardly extending from wall 128 is a longitudinally extending guide tongue 131 (FIG. 8) slidably received in the slot 112 of rib 108 of the beam 74. Inwardly projecting from the upstanding vertical wall 128 of the pin section 126 of the link connecting bracket is a pin 136 that is received in sleeve 124.

The link pair 18 illustrated in FIG. 7 is formed of first and second crossed links 140,142 pivotally interconnected at a common midpoint thereof on a connecting pin 145. Each link is formed with enlarged outer portions, as indicated at upper and lower ends 148 and 150 of link 140. These enlargements stiffen and strengthen the links while providing a relatively narrow (in the direction of the axis of pivot pin 145) intermediate link section 152 which enables more compact positioning and folding of the links.

End 150 of link 140 is apertured as at 154 (FIG. 6) and pivotally receives sleeve 124 of the link connecting bracket sleeve section 111.

As can be seen in the cross sectional view of FIG. 8, which shows the link, hinge block and beam in assembled condition, the two connecting hinge block sections 111, 126 are firmly held together and in alignment by the slidable mounting of their outwardly projecting guide tongues 120,131 in the inwardly slotted beam ribs 106,108. The pin section and sleeve section form a journal upon which is pivoted the end of one of the actuator links, link 140 in FIG. 8, to firmly mount the end of the link to the beam in a highly stable relation. The link connecting bracket and connection to the link described to this point afford a connection between the link and the fixed beam that enables both pivotal motion of the beam around the axis of sleeve 124 and pin 136, and at the same time allows a slidable motion of the entire link connecting bracket and link end assembly relative to the beam, as tongues 120 and 131 are slidably and movably received within the beam ribs 106,108.

It will be readily understood that for crossed link supports of the type illustrated herein four of the link ends are fixed to the fixed beams while the other four are slidably connected to the fixed beam, as mentioned above. In order to selectively fix the otherwise slidable link connecting brackets formed by sleeve sections 111 and pin sections 126 to the beams, those connections at which the connecting brackets are to be fixed are formed with apertures, such as aperture 170 in flange 118 of sleeve section 111 and a corresponding mating aperture 172 in one or more of the beam ribs 106,108 of the beam. Thus a screw or bolt 174 (see FIG. 7) may be inserted through the holes 170,172 to prevent slidable motion of the link connecting brackets relative to the beam. Thus, for example, all four of the link connecting brackets on the right side of the vent may be fixed to the beams, whereas all four of the link connecting brackets on the left side of the vent may be allowed to slide to enable the pivoted crossed links to move between upper and lower positions, as will be described more particularly below.

In order to pivot the links relative to one another so as to move the cover, a conventional geared actuator 180, having an arm 182 extending through a slot in the lower beam web, is bolted to the underside of each lower beam, such as beam 74 illustrated in FIG. 7. Each actuator includes a handle 184 by means of which an internal gear 183, mounted within the actuator, may be rotated to rotate actuator arm 182 in a conventional manner about an axis 185 that extends perpendicular to the longitudinal extent of the beam. The end of actuator arm 182, which is fixed to gear 183 within the actuator, is pivoted at its free end 186 to a drive link 188, which has its other end pivoted to the crossed links 140,142 at the point 145 of their pivotal interconnection with one another. Thus by rotation of actuator handle 184, which rotates gear 183, the actuator arm 182 is pivoted about its axis 185 to move the drive link 188 and thereby move the pivot 145 of the crossed links to raise or lower both crossed links between the solid and dotted line positions illustrated in FIG. 5. The geared interconnection between handle 184 and gear 183 effectively locks the cover in any position of adjustment and provides a positive, operator controlled drive for both raising and lowering the front or back of the cover.

The rear link pair 20 includes links 200 and 202 which are identical to the links of the forward pair 18 and are similarly operated by means of an actuator 206 (FIG. 4), having a handle 208, and a rear drive link (not shown) connected to the actuator arm. It will be seen that the two sets of transversely extending crossed links and actuators are operable completely independent of each other. The links, the hinge blocks the frame and all supports excepting only the actuators, actuator arms, drive links and transverse beams (which are made of a suitable rigid metal such as aluminum) are all made of a strong but flexible plastic, such as Delrin, for example.

Thus the links may bend or twist as may be necessary to raise solely one end or the other end of the vent cover.

When both forward and rear actuators are operated to collapse both pairs of crossed links, cover 16 is in its lower, fully closed position, which is illustrated in FIGS. 1 and 3 and in solid lines in FIG. 4. In this position the inside of the cover rests upon the continuous cover support flanges 42,44,46,48 (for the full length of these flanges), which are integral with the frame, and may be pulled tightly down against the continuous upper edge of these flanges by operation of the actuators to provide a good tight seal. If forward actuator 180 and its handle 184 are operated, but the rear actuator is left in its lowermost position, cover 16 will have its front end portion 220 raised above the top of fixed riser 14 to attain a position illustrated in dotted lines in FIG. 4. The raised front of the cover forms a cover front opening into which air is directed smoothly by the aerodynamically curved riser when the vehicle is in motion. In this position the cover 16 of course is tilted so that the pair of rear crossed links will twist slightly about a transverse axis, and the front links 140,142 will bend somewhat as illustrated in the drawing. It is to enable this bending of the front links and the slight twisting of the rear pair of links that the links are made of a strong but flexible and resilient plastic. Despite this bending or twisting, the link ends provide a stable mounting for the cover because they are securely and firmly connected to the link connecting brackets, which in turn are firmly and securely mounted to and within the fixed transverse beams.

The function of the flexibility of the crossed links may be alternatively achieved by mounting the several beams with a small amount of pivotal motion about axes extending longitudinally of the beams. With such pivotal mounting of the beams the links may be less flexible or not flexible at all. However, the described rigid mounting of the beams, together with flexibility of the crossed links, is preferred for a more rigid and stable overall vent structure.

If both fore and aft actuators are operated to raise both the front and back of the cover, the cover will attain the position illustrated in FIG. 2 wherein the entire cover is raised above the frame rim and above the riser. The vent opening in this position acts as a small window, completely open, in the roof of the vehicle. The position of FIG. 2 is preferably employed only while the vehicle is at rest, whereas the dotted line position of FIG. 4 may be employed when the vehicle is in motion to cause the cover front opening 224 to act as a scoop, receiving air directed into the opening by the aerodynamically shaped fixed forward riser 14.

Figure 9:
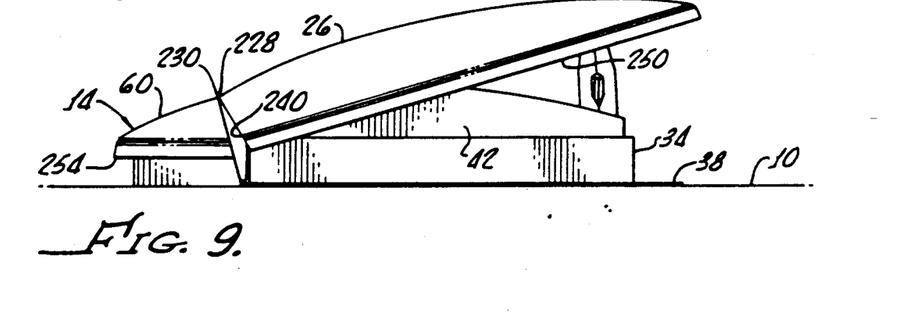
FIG. 9 is a side elevation of the vent showing the rear portion raised with the front portion closed.

With the forward links in their lowermost position the rear actuator may be operated to raise the rear pair of links to attain the position illustrated in FIG. 9, wherein the rear of the cover is raised but the front is down. Note that in this position the forward edge 228 of the front of the cover 16 may contact the rearward edge 230 of the riser top 60, thereby keeping the front of the cover substantially closed. To enable this relative pivotal motion the front of the cover is cut back, as at 240, to incline downwardly and rearwardly along its sides. However, the rear edge 242 of the riser surface 60 is also inclined at a complimentary angle to incline downwardly and rearwardly so as to provide a closed continuous side for the vent, as can be seen in FIG. 1, where the rear edges of the fixed riser mate with the forward edges of the movable cover. The cover in its closed position rests upon and is sealed against the cover support flanges 42,44,46,48 while its lower peripheral edge 250 is spaced above the roof 10. The fixed riser is fixed to the frame only at its rear portion, and its forwardly extending surface 60 has its peripheral edge 254 similarly spaced above the vehicle roof to provide a continuous visual line entirely around the vent.

In the position of FIG. 9 wherein only the rear of the vent is raised, just as in the position of FIG. 4 wherein only the front of the cover is raised, one set of links (the rear set in this case) will bend, whereas the other set will twist slightly about a transverse axis as previously described.

It will be seen that there has been described an improved multi position vent providing a smooth low drag aerodynamic shape that is aesthetically pleasing, which produces less air turbulence and provides increased aerodynamic efficiency. The aerodynamic shape improves the flow of air both in and out, where air is caused to flow in through the front of the raised vent cover when the vehicle is in motion or is caused to be extracted through the rear of the raised rear portion of the vent by venturi action when the vehicle is in motion. The arrangement provides maximum natural ventilation when the vehicle is at rest and the vent is in fully raised position. The described garnish acts as a clamping ring to provide a clean exterior look and to facilitate installation. The extreme positions illustrated in FIGS. 1, 2, 4 (dotted lines) and 9 are limiting positions and, as will be readily appreciated, unlimited intermediate positions may be attained by operating one or the other or both actuator mechanisms to greater or lesser amounts so as to control the degree of air taken in or extracted. The fixed riser improves the resistance of the closed vent to leakage and yet, when the front of the vent is raised, acts to direct air into the scooping raised cover.

If deemed necessary or desirable, to enhance fore and aft stabilization, one or more diagonal tension braces maybe connected to the several transverse beams. For example, a screw (not shown) may be inserted into the end of rear slot 112 of the front frame mounted beam 74 to pivotally mount one end of a diagonal brace (not shown) having its other end similarly connected to another screw (not shown) inserted in the end of a forward slot of the corresponding end of the diagonally opposite, rear cover mounted beam 80. This longitudinal stabilizing maybe accomplished by either one or one pair of crossed braces on each side of the vent.

Even though a long continuous stabilizing hinge is not employed, the disclosed mounting and connection of the crossed links and the mounting and connection of the actuator arms are highly stable. Note that the link connecting brackets are firmly and securely mounted to and confined within the fixed cross beams by their interaction with the guiding and strengthening beam ribs 106,108. The metal actuator arms 182 and drive links 188 are sandwiched between the crossed links to provide a compact rigid assembly. The arrangement provides both fore and aft and lateral stability and positive bi-directional drive to forcibly move the cover either upwardly or downwardly.

The foregoing detailed description is to be clearly understood as given by way of illustration and example only, the spirit and scope of this invention being limited solely by the appended claims.

What is claimed is:

1. A vent assembly for a vehicle having a ventilation opening formed in a wall thereof, said assembly comprising:
    a vent frame adapted to be mounted to said vehicle to frame said opening,
    a vent cover having a forward portion defining a cover front opening and having a rear portion,
    means for mounting said forward portion to said frame for motion between a forward portion lower position in which said cover front opening is adjacent said frame, and a cover forward portion upper position in which said cover front opening is displaced from said frame,
    a riser fixed to said frame adjacent said vent cover forward portion and configured and arranged to close said cover front opening when said cover forward portion is in said lower position and to direct air past the riser into said cover front opening when said cover forward portion is in said upper portion, said riser and cover forming a continuous low drag aerodynamic surface when said cover forward portion is in said lower position, and
    means for connecting said vent cover rear portion to said frame.

2. The vent assembly of claim 1 wherein said riser extends in a smooth aerodynamic curve forwardly and downwardly from said vent cover.

3. The vent assembly of claim 1 wherein said means for mounting said open front comprises a pair of transversely extending crossed and pivotally interconnected flexible links pivotally connected to and between a front portion of said vent frame and a front portion of said vent cover.

4. The vent assembly of claim 1 wherein said means for connecting said vent cover rear portion to said frame comprises a pair of transversely extending crossed and pivotally interconnected flexible links connected to and between a rear portion of said vent frame and said rear portion of said cover.

5. The vent assembly of claim 1 wherein said riser comprises a transversely extending body fixed to said frame and extending longitudinally in a smooth aerodynamic curve upwardly and rearwardly from a location forward of said cover front opening.

6. The vent assembly of claim 5 wherein said riser body has a front portion positioned forward of said frame.

7. A vent assembly for a vehicle having a ventilation opening formed in a wall thereof, said assembly comprising:
    a vent frame adapted to be mounted to said vehicle to frame said opening,
    a vent cover having an open front defining a cover front opening and having a rear portion,
    a riser fixed to said frame forward of and adjacent said cover, said riser having a rear portion displaced from said frame and having a riser forward portion located forward of said frame,
    means for mounting said open front to said frame for motion between a cover front lower position in which said cover front opening is adjacent to and closed by said rear portion of said riser, and a cover front upper position in which said cover front opening is open and displaced from said riser rear portion, and
    means for connecting said vent cover rear portion to said frame.

8. The vent assembly of claim 7 wherein said means for mounting said open front comprises a pair of transversely extending crossed an pivotally interconnected links pivotally connected to and between a front portion of said vent frame and a front portion of said vent cover.

9. The vent assembly of claim 8 wherein said means for connecting said vent cover rear portion to said frame comprises a pair of transversely extending crossed and pivotally interconnected links connected to and between a rear portion of said vent frame and said rear portion of said cover.

10. The vent assembly of claim 9 including geared actuator means for driving at least one of said pairs of links.

11. The assembly of claim 8 wherein said riser and vent cover form a smooth, substantially continuous aerodynamically curved surface when said open front is in said cover front lower position.

12. The vent assembly of claim 7 wherein said means for mounting said open front comprises a pair of transversely extending crossed and pivotally interconnected flexible links, at least one of which has an end portion formed with a pivot aperture therein, and including a transversely extending channel shaped beam fixed to said frame, said beam having first and second legs interconnected by a web, a first hinge block section slidably mounted in one of said legs and having a transversely extending sleeve fixed thereto and pivotally received in said pivot aperture, and a second hinge block section slidably mounted in the other of said legs and having a transversely extending pin fixed thereto an received in said sleeve.

13. The vent assembly of claim 12 including a geared actuator arm pivoted to said beam, a connecting link pivotally interconnected between said actuator arm and said crossed links, and gear means for operating said actuator arm and connecting link to raise or lower said crossed links.

14. The vent assembly of claim 13 wherein said means for connecting said vent cover rear portion to said frame comprises third and fourth flexible crossed links, at least one of which has a second pivot aperture therein, a second transversely extending channel shaped beam fixed to said frame and having third and fourth legs interconnected by a second web, each said third and fourth leg having a longitudinally extending inwardly opening guide slot formed therein, a third hinge block section slidably received in the guide slot of said third leg and having a second transversely extending sleeve fixed thereto, said second sleeve being pivotally received in said second pivot aperture, a fourth hinge block section slidably received in the guide slot of said second leg and having a transversely extending pin fixed thereto and received in said second sleeve, a second geared actuator arm pivoted to said second beam, a rear connecting link pivotally interconnected between said second actuator arm and said third and fourth flexible crossed links, said second actuator arm being at least partly received within said second channel shaped beam when said cover is in said closed position.

15. A vent assembly for a vehicle having a ventilation opening formed in a wall thereof, said assembly comprising:
a vent frame adapted to be mounted to said vehicle around said opening and having a front and a back,
a vent cover configured and arranged to selectively cover said vehicle opening and having a front and back,
a first pair of crossed links pivotally interconnected to each other at intermediate portions thereof and configured and arranged to movably connect said cover front to said frame front,
a second pair of crossed links pivotally interconnected to each other at intermediate portions thereof and configured and arranged to movably connect said cover back to said frame back,
a front actuator arm movably connected to said frame front and having an arm end,
a front drive link connected between said front actuator arm end and said intermediate portions of said first pair of crossed links,
means on said frame for driving said front actuator arm,
a rear actuator arm movably connected to said back of said frame and having an actuator arm end,
a back drive link connected between said second actuator arm end and said intermediate portions of said second pair of crossed links, and
means on said frame for driving said rear actuator arm.

16. The vent assembly of claim 15 wherein said means for driving said front and rear actuator arms are mutually independent, whereby said first and second pairs of crossed links may be driven independently to allow said front and back of said cover to be moved independently.

17. The vent assembly of claim 15 wherein said crossed links are flexible.

18. The vent assembly of claim 15 wherein said crossed links extend transversely of said vent frame and vent cover.

19. The vent assembly of claim 15 including a first mounting beam fixed to and extending transversely across the front of said frame, a second mounting beam fixed to and extending transversely across the back of said frame, a third mounting beam fixed to and extending transversely across said cover front, a fourth mounting beam fixed to and extending transversely across said cover back, said first pair of crossed links having end portions thereof pivotally and slidably mounted to and within said first and third mounting beams, and said second pair of crossed links having end portions thereof pivotally and slidably mounted to said second and fourth mounting beams.

20. The vent assembly of claim 19 wherein at least one of said drive links is pivoted to and between links of one of said pairs of crossed links.

21. The vent assembly of claim 19 wherein in at least one of said mounting beams has a channel shaped cross section and wherein one of said actuator arms is movable to a cover closed position wherein such arm is at least partly within said one mounting beam.

22. The vent assembly of claim 19 wherein at least one end of one link of said first pair of crossed links is connected to said first mounting beam by a sliding hinge block, said sliding hinge block comprising a first hinge block section slidably mounted to said first mounting beam, a second hinge block section slidably mounted to said first mounting beam in opposition to said first hinge block section, a hinge sleeve extending between said first and second hinge block sections and fixed to said first hinge block section, said one end of said one link having an aperture extending there through that receives said hinge sleeve.

23. The vent assembly of claim 19 wherein at least one of said beams comprises a channel having a channel web and first and second channel legs, each said leg having an inwardly opening longitudinally extending guide slot formed therein, a hinge block connecting one end of one of said links to said one beam, said hinge block comprising a first hinge block section having a longitudinally extending flange received in the guide slot of one of said channel legs and having a transversely extending open ended sleeve fixedly secured thereto, a second hinge block section having a longitudinally extending flange received in the guide slot of the second of said channel legs having a transversely extending pin received in said open ended sleeve, said one end of said one link having a bearing aperture pivotally receiving said open ended sleeve.

24. The vent assembly of claim 15 wherein said means for driving said front and rear actuator arms comprises means for independently operating said actuator arms whereby the front of said cover may be moved relative to the frame independently of the back of said cover, and the back of said cover may be moved relative to said frame independently of the front of said vent cover, said crossed links being flexible to allow motion of the front of the cover relative to the back of the frame without corresponding motion of the back of the cover and to allow motion of the back of the cover relative to the front of the frame without corresponding motion of the front of the cover.

25. The vent assembly of claim 15 wherein said means for driving said front and rear actuator arms comprise mutually independent front and back geared actuator drives respectively mounted to the front and back of said frame.

26. The vent assembly of claim 15 wherein the vent cover front is movable to a closed cover position in which the cover front is spaced from said frame and cooperates with the frame to define a front cover vent opening, and including a riser fixed to said frame adjacent the front of said frame said riser having a surface that extends to said cover front and closes said front cover vent opening when the vent cover front is in said closed cover position, said vent cover being movable to an open position in which said cover front is spaced from said riser, whereby said front cover vent opening is open and said riser may direct air into said front cover vent opening.

27. The vent assembly of claim 26 wherein said riser and vent cover form a smooth, substantially continuous aerodynamically curved surface when both the front and back of said cover are in closed positions.

28. A vent assembly for a Vehicle having a ventilation opening formed in a wall thereof, said assembly comprising:
a vent frame adapted to be mounted to said vehicle around said opening and having a front and back,
a vent cover having a front and back,
a first pair of flexible crossed and pivotally interconnected links movably connecting the front of the cover to the front of the frame for motion between a first position wherein the front of the cover is adjacent the frame and a second position in which the front of the cover is displaced from the frame,
a second pair of flexible crossed and pivotally interconnected links interconnecting the back of the cover with the back of the frame for motion between a first position wherein the back of the cover is adjacent the back of the frame and a second position wherein the back of the cover is displaced from the back of the frame, and
means for independently moving said first and second pairs of links.

29. The vent assembly of claim 28 wherein said means for independently moving comprise first and second geared actuator means mounted to the front and back of the frame respectively for moving the front of the cover relative to the front of the frame independently of motion of the back of the cover relative to the back of the frame, and for independently moving the back of the cover relative to the front of the frame independently of motion of the front of the cover relative to the front of the frame.

30. The vent assembly of claim 28 wherein said links all extend transversely of said vent cover.

31. The vent assembly of claim 28 wherein the front of the cover in said first position is spaced from said frame and cooperates with the frame to define a front cover vent opening, and including a riser fixed to said frame adjacent the front of said frame and having a surface that extends to said front cover and closes said front cover vent opening when said front of the cover is in said first position, said front cover vent opening in said second position of said front of the cover being spaced from said riser whereby said front cover vent opening is open and not closed by said riser in said second position.

32. The assembly of claim 31 wherein said riser and vent cover form a smooth, substantially continuous aerodynamically curved surface when both the front and back of said back cover are in said second positions.

* * * * *